UNITED STATES PATENT OFFICE.

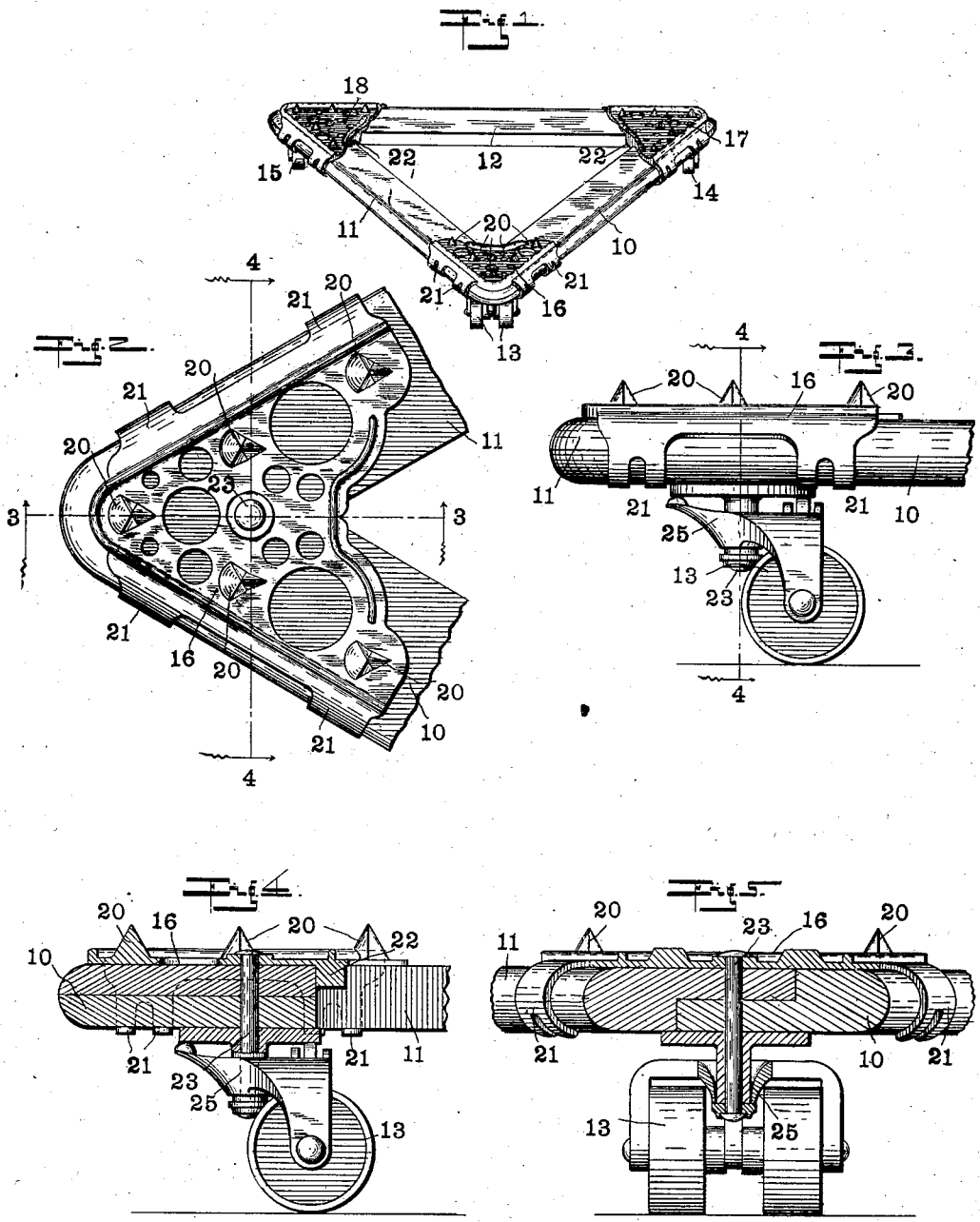

ROBERT L. DORSEY, OF INDIANAPOLIS, INDIANA, ASSIGNOR TO TUCKER & DORSEY MANUFACTURING COMPANY, OF INDIANAPOLIS, INDIANA, A CORPORATION OF INDIANA.

TRUCK.

SPECIFICATION forming part of Letters Patent No. 726,035, dated April 21, 1903.

Application filed June 20, 1902. Serial No. 112,445. (No model.)

*To all whom it may concern:*

Be it known that I, ROBERT L. DORSEY, a citizen of the United States, residing at Indianapolis, in the county of Marion and State of Indiana, have invented certain new and useful Improvements in Trucks, of which the following is a specification.

My present invention relates to that class of trucks which are commonly used in "store-service" for transporting boxes and barrels about mercantile establishments; and it consists in a certain construction whereby great strength and durability are secured at a minimum of cost, all as will be hereinafter more particularly described and claimed.

Referring to the accompanying drawings, which are made a part hereof, and on which similar reference characters indicate similar parts, Figure 1 is a perspective view of a truck embodying my said invention; Fig. 2, a top or plan view of one corner thereof on an enlarged scale; Fig. 3, a side elevation of the same portions shown in Fig. 2; Fig. 4, a central vertical sectional view on the dotted line 3 3 in Fig. 2, and Fig. 5 a transverse vertical sectional view as seen when looking in the direction indicated by the arrows from the dotted line 4 4 in Figs. 2 and 3.

My truck is composed of a suitable frame, including side members 10, 11, and 12, which are halved together where they meet, suitable casters 13, 14, and 15 at the respective corners, and peculiar corner-irons 16, 17, and 18, also at said corners, uniting the structure firmly at these points. These corner-irons are made to embrace the corners of the frame, forming both bearing-plates for the upper surface of the truck and union-pieces for the frame itself. The plates preferably have a number of upward projections or points 20, upon which the load rests when the truck is in use and which serve to hold the load securely in place. It has ears or wings 21, which extend around and embrace the edges of the frame sides at the points where they are applied. A projection 22 on each of said corner-irons is also preferably provided to extend down into the point or angle where the sides come together and which forms one part of the locking means. The wings 21, which extend over the sides, are designed to be bent in tightly against the edges of said sides after the irons have been put in place, so as to closely embrace said sides and clamp the same firmly and securely together. A single rivet 23 extends up through each caster-housing 25 and the adjacent corner-iron and holds the various parts firmly together at each of the points or corners. No other bolts, nails, screws, or rivets are required in the construction of my improved truck, saving and excepting only this single rivet which unites the several parts. I am thus enabled to produce a truck of this character at low cost both as to material and labor and one which is strong, durable, and efficient.

Having thus fully described my said invention, what I claim as new, and desire to secure by Letters Patent, is—

1. The combination, in a truck, of frame sides, corner-irons embracing the frame sides where they come together, casters on which the frame is mounted, and a single rivet uniting the casters, frames and corner-irons together at each point where the casters and corner-irons are applied.

2. The combination, in a truck, of a frame composed of sides coming together at the corners, casters supporting the same, and corner-irons uniting the corners, said corner-irons having wings which embrace the edges of the sides and clamp the same together, substantially as shown and described.

3. The combination, in a truck, of frame sides halved at the ends where they come together forming the corners of the truck, casters on which the frame is mounted, corner-irons placed above the frame parts, the caster-plate placed below the frame part, and a single rivet extending through each corner-iron frame-corner and caster-plate and uniting the whole together, substantially as set forth.

4. The combination, in a truck, of frame sides, corner-irons uniting the corners thereof said corner-irons having wings which extend around the edges of said frame sides and embrace said sides and clamp the same firmly and securely together, casters supporting the frame at the corners the caster-plates whereof bear against the under sides of the frame opposite the plate or central portion of the corner-irons, and a rivet passing through the corner-irons, frame and caster-plate and uniting the same.

5. The combination, in a truck, of a frame composed of sides coming together at the corners, casters supporting the same, and corner-irons uniting the corners, said corner-irons having wings which embrace the edges of the sides and clamp the same together, and projections which extend down into the angle where the sides come together.

In witness whereof I have hereunto set my hand and seal, at Indianapolis, Indiana, this 13th day of June, A. D. 1902.

ROBERT L. DORSEY. [L. S.]

Witnesses:
 ARTHUR M. HOOD,
 JAMES A. WALSH.